US012119549B2

(12) United States Patent
Barrera et al.

(10) Patent No.: US 12,119,549 B2
(45) Date of Patent: Oct. 15, 2024

(54) ELECTRONIC DEVICE ANTENNAS IN ACOUSTIC CAVITIES

(71) Applicant: Apple Inc., Cupertino, CA (US)

(72) Inventors: Joel D Barrera, Cedar Park, TX (US); Nikolaos Chiotellis, San Jose, CA (US); Michael J Williams, Saratoga, CA (US); Jerzy S Guterman, Sunnyvale, CA (US); Trevor J Edmonds, San Francisco, CA (US); Joshua P Song, Cupertino, CA (US); Richard D Kosoglow, San Jose, CA (US)

(73) Assignee: Apple Inc., Cupertino, CA (US)

( * ) Notice: Subject to any disclaimer, the term of this patent is extended or adjusted under 35 U.S.C. 154(b) by 197 days.

(21) Appl. No.: 17/832,465

(22) Filed: Jun. 3, 2022

(65) Prior Publication Data

US 2023/0395984 A1 Dec. 7, 2023

(51) Int. Cl.
*H01Q 1/22* (2006.01)
*H01Q 13/18* (2006.01)
*H04R 1/02* (2006.01)

(52) U.S. Cl.
CPC ............... *H01Q 13/18* (2013.01); *H01Q 1/22* (2013.01); *H04R 1/02* (2013.01)

(58) Field of Classification Search
CPC .. H01Q 13/18; H01Q 1/22; H01Q 1/241-243; H04R 1/02
See application file for complete search history.

(56) References Cited

U.S. PATENT DOCUMENTS 4,071,111 A * 1/1978 Croup ...................... H04R 1/44 181/149
6,774,744 B1 * 8/2004 Hattori .................. H01P 1/2086 333/219.1
6,995,715 B2 2/2006 Ying et al.
7,565,184 B2 * 7/2009 Lee ...................... H04R 1/2811 379/433.02

(Continued)

FOREIGN PATENT DOCUMENTS

CN 213718161 U 7/2021
CN 213751226 U 7/2021

OTHER PUBLICATIONS

U.S. Appl. No. 17/573,524, filed Jan. 11, 2022.

*Primary Examiner* — Hasan Islam
*Assistant Examiner* — Jordan E. DeWitt
(74) *Attorney, Agent, or Firm* — Treyz Law Group, P.C.; Michael H. Lyons; Jinie M. Guihan

(57) ABSTRACT

An electronic device may have an upper housing and a lower housing separated by a slot. An antenna module may be mounted in the lower housing and may include a cavity. An antenna element may be disposed within the cavity. Grounded traces may be patterned onto walls of the module and may be coupled to conductive walls of the lower housing by conductive gaskets. The antenna element may have a high band arm displaced farther into the cavity than a low band arm by a shim. The antenna module may have an acoustic port aligned with a speaker port. The acoustic port may allow sound waves from a speaker to pass into the cavity from the speaker port. The cavity may be configured to optimize an audio response of the speaker while concurrently optimizing radio-frequency performance of the antenna element.

20 Claims, 7 Drawing Sheets

(56) References Cited

U.S. PATENT DOCUMENTS 8,260,343 B2 9/2012 Eaton et al.
8,314,667 B2 * 11/2012 Uhm ........ H01P 1/20336 333/204
8,482,469 B2 * 7/2013 Ayala ........ H01Q 9/42 343/702
8,963,782 B2 * 2/2015 Ayala Vazquez ........ H01Q 1/42 343/702
9,178,268 B2 11/2015 Zhu et al.
9,203,137 B1 * 12/2015 Guterman ........ H01Q 1/243
9,236,648 B2 * 1/2016 Guterman ........ H01Q 5/378
9,425,496 B2 8/2016 Zhu et al.
9,455,489 B2 9/2016 Shiu et al.
9,496,608 B2 * 11/2016 Jiang ........ H01Q 1/245
9,653,777 B2 5/2017 Guterman et al.
9,937,526 B2 * 4/2018 Shiu ........ H01Q 7/00
10,170,839 B2 * 1/2019 Xue ........ H01Q 9/0457
10,268,236 B2 4/2019 Guterman et al.
10,283,844 B2 5/2019 Rajagopalan et al.
10,476,136 B2 11/2019 Mow et al.
10,784,582 B2 * 9/2020 Kuroiwa ........ H01Q 1/243
10,862,190 B1 * 12/2020 Ramasamy ........ G06F 1/1688
10,862,195 B2 12/2020 Ouyang et al.
10,886,596 B2 * 1/2021 Yang ........ H01Q 1/125
10,950,932 B1 3/2021 Ruaro et al.
11,116,117 B2 9/2021 Ramasamy et al.
2003/0003970 A1 * 1/2003 Johnson ........ H04M 1/0202 455/569.2
2004/0203997 A1 * 10/2004 Kaikuranta ........ H01Q 1/44 455/575.1
2005/0024271 A1 * 2/2005 Ying ........ H04B 1/38 343/702
2005/0233781 A1 * 10/2005 Erixon ........ H01Q 1/243 455/575.1
2006/0220966 A1 * 10/2006 Sarychev ........ H01Q 9/42 343/702
2009/0051604 A1 * 2/2009 Zhang ........ H01Q 1/243 343/702
2009/0262029 A1 10/2009 Chiang et al.
2010/0073241 A1 * 3/2010 Ayala Vazquez .... H01Q 1/2266 343/702
2010/0123639 A1 * 5/2010 Tai ........ H01Q 21/29 343/893
2010/0149751 A1 * 6/2010 Camacho ........ G06F 1/1698 343/702
2010/0182205 A1 * 7/2010 Chiang ........ H01Q 1/2266 343/702
2010/0231481 A1 * 9/2010 Chiang ........ H01Q 9/42 343/702
2010/0283685 A1 * 11/2010 Tsai ........ H01Q 1/243 343/700 MS
2011/0006953 A1 * 1/2011 Chiang ........ G06F 1/1698 343/702
2011/0241943 A1 * 10/2011 Shiu ........ H01Q 13/18 228/256
2012/0114163 A1 5/2012 Yang
2013/0050032 A1 * 2/2013 Shiu ........ H01Q 1/2258 343/702
2013/0076574 A1 * 3/2013 Rappoport ........ H01Q 1/243 343/702
2013/0293424 A1 11/2013 Zhu et al.
2014/0009344 A1 * 1/2014 Zhu ........ H01Q 1/2266 343/702
2014/0085161 A1 * 3/2014 Zhu ........ H01Q 5/378 343/867
2014/0086441 A1 * 3/2014 Zhu ........ H01Q 7/00 343/866
2014/0100004 A1 * 4/2014 Yarga ........ H01Q 1/38 455/575.8
2015/0364821 A1 * 12/2015 Tao ........ H01Q 9/42 29/601
2016/0294067 A1 * 10/2016 Chang ........ H01Q 5/364
2017/0170545 A1 * 6/2017 Merli ........ H01Q 9/0457
2017/0207524 A1 * 7/2017 Cardinali ........ H05K 3/284
2017/0212554 A1 * 7/2017 Guterman ........ G06F 1/1681
2019/0027808 A1 * 1/2019 Mow ........ H04R 5/04
2019/0356051 A1 * 11/2019 Barrera ........ H01Q 1/44
2020/0259258 A1 * 8/2020 Amiri ........ H01Q 5/378
2020/0266539 A1 * 8/2020 Cooper ........ H01Q 1/243
2020/0280133 A1 * 9/2020 Avser ........ H01Q 5/42
2020/0303824 A1 * 9/2020 Barrera ........ H01Q 13/18
2020/0381801 A1 * 12/2020 Oh ........ H01Q 1/2266
2021/0066799 A1 * 3/2021 Avser ........ H01Q 5/25
2021/0242565 A1 * 8/2021 Kim ........ H01Q 21/065
2021/0328334 A1 * 10/2021 Cooper ........ H01Q 1/526
2021/0399429 A1 12/2021 Garrido Lopez et al.
2023/0033219 A1 * 2/2023 Wu ........ H01Q 1/2291
2023/0395984 A1 * 12/2023 Barrera ........ H01Q 1/22

* cited by examiner

ELECTRONIC DEVICE ANTENNAS IN ACOUSTIC CAVITIES

BACKGROUND

This relates generally to electronic devices and, more particularly, to wireless electronic devices with antennas.

Electronic devices often include antennas. For example, cellular telephones, computers, and other devices often contain antennas for supporting wireless communications.

It can be challenging to form electronic device antenna structures with desired attributes. In some wireless devices, the presence of conductive housing structures can influence antenna performance. Device size can also affect performance. It can be difficult to achieve desired performance levels in a compact device, particularly when the compact device has conductive housing structures.

It would therefore be desirable to be able to provide improved wireless circuitry for electronic devices.

SUMMARY

An electronic device may have a metal housing. The metal housing may have an upper housing in which a component such as a display is mounted and a lower housing in which a component such as a keyboard is mounted. Hinges may be used to mount the upper housing to the lower housing for rotation about a rotational axis.

An antenna module may be mounted in the lower housing between upper and lower conductive housing walls. The antenna module may include dielectric walls that define respective edges of a cavity enclosed within the antenna module. An antenna resonating element may be disposed within the cavity on one of the dielectric walls. The antenna resonating element may radiate through a slot between the upper and lower housings. Grounded conductive material such as conductive traces may be patterned onto each of the dielectric walls except the dielectric wall having the antenna resonating element. The grounded conductive material may be electrically sealed using solder to configure the cavity to form an electromagnetic cavity that optimizes radio-frequency performance of the antenna resonating element. The grounded conductive material may be electrically coupled to the upper and lower conductive housing walls using conductive gaskets. A conductive plate may be embedded in one of the dielectric walls to support a transmission line. Multiple conductive gaskets may couple an upper side of the antenna module to the upper conductive housing wall to allow conductive material between the gaskets to be removed, thereby increasing antenna volume. The antenna resonating element may have a low band arm and a high band arm. The high band arm may be displaced farther into the cavity than the low band arm to optimize high band performance. A dielectric support structure such as a shim may support the high band arm within the cavity.

A speaker may be mounted in the lower housing adjacent the antenna module. The speaker may have first and second speaker ports. The antenna module may have an acoustic port structure that is aligned with the first speaker port. The acoustic port structure may include vents in one of the dielectric walls and the conductive material of the antenna module. The vents may be separated by ribs. The speaker may emit sound waves. A portion of the sound waves may pass through the first speaker port and the vents into and out of the cavity. The dielectric walls of the cavity may be joined together using ultrasonic welds to form a robust acoustic seal for the sound waves. The sound waves may pass through the second speaker port to be heard by a user. The ribs may have a pitch that is selected to be transparent to the sound waves but opaque to radio-frequency signals conveyed by the antenna resonating element. The cavity may be configured to optimize an audio response of the speaker while concurrently optimizing radio-frequency performance of the antenna resonating element.

DETAILED DESCRIPTION

Figure 1:
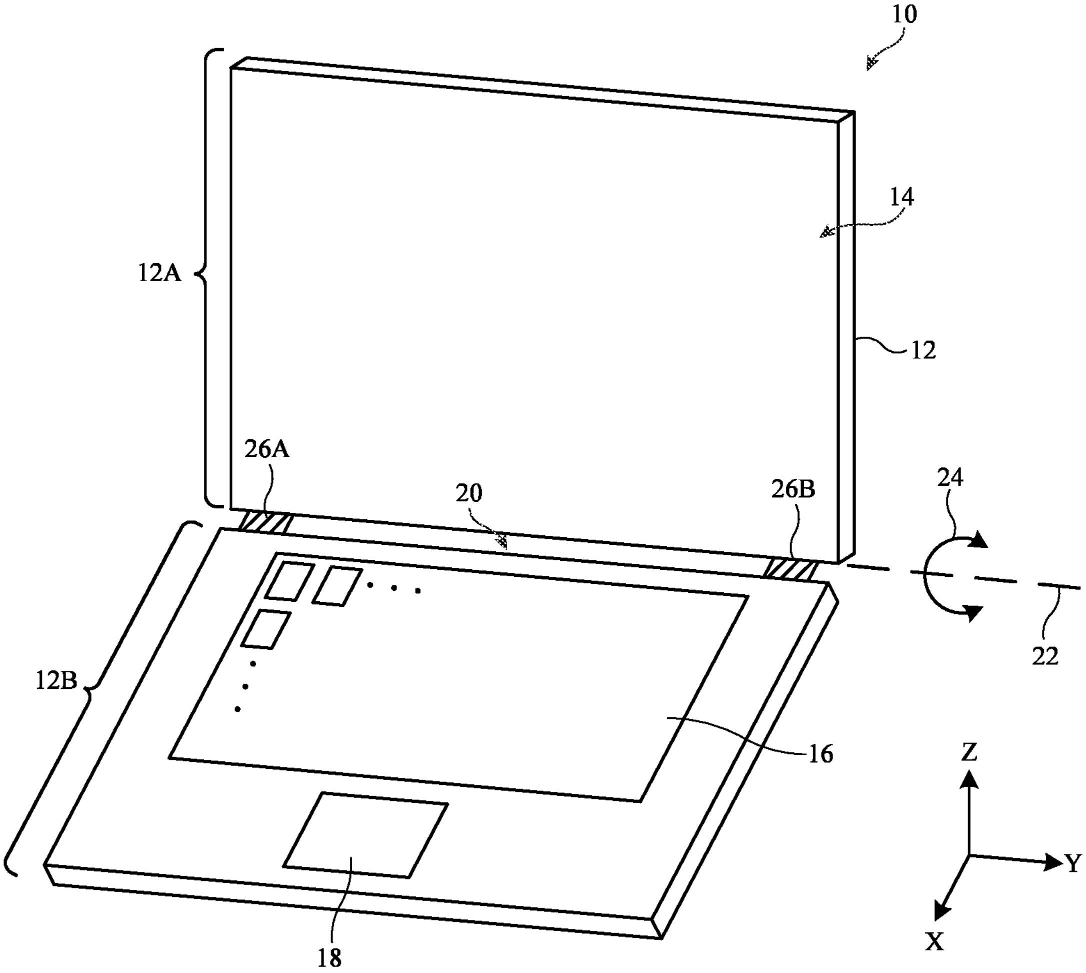
FIG. 1 is a perspective view of an illustrative electronic device such as a laptop computer in accordance with some embodiments.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHz Bluetooth® or other wireless personal area network (WPAN) bands and the 2.4 GHz and 5 GHz Wi-Fi® band or other wireless local area network (WLAN) bands (sometimes referred to as IEEE 802.11 bands or wireless local area network communications bands). Device 10 may also contain wireless communications circuitry for performing near-field communications, communications at millimeter/centimeter wave frequencies, light-based wireless communications, satellite navigation system communications, or other wireless communications.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, wireless base station, wireless access point, home entertainment console, portable speaker, gaming accessory, wristwatch device, head-mounted display device, or other wearable device, or may be other electronic equipment. Configurations in which device 10 has a rotatable lid as in a portable (e.g., laptop) computer are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Some of the structures in housing 12 may be conductive. For example, metal parts of housing 12 such as metal housing walls may be conductive. Other parts of housing 12 may be formed from dielectric material such as plastic, glass, ceramic, non-conducting composites, etc. To ensure that antenna structures in device 10 function properly, care should be taken when placing the antenna structures relative to the conductive portions of housing 12.

If desired, portions of housing 12 may form part of the antenna structures for device 10. For example, conductive housing sidewalls may form all or part of an antenna ground. The antenna ground may include planar portions and/or portions that form one or more cavities for cavity-backed antennas. In addition to portions of housing 12, the cavities in the cavity-backed antennas may be formed from metal brackets, sheet metal members, and other internal metal structures, and/or metal traces on dielectric structures (e.g., plastic structures) in device 10. Metal traces may be formed on dielectric structures using molded interconnect device techniques (e.g., techniques for selectively plating metal traces onto regions of a plastic part that contains multiple shots of plastic with different affinities for metal), using laser direct structuring (LDS) techniques (e.g., techniques in which laser light exposure is used to activate selective portions of a plastic structure for subsequent electroplating metal deposition operations), or using other metal trace deposition and patterning techniques.

As shown in FIG. 1, device 10 may have input-output devices such as track pad 18 (e.g., a touch pad, mouse, other touch-based user input device) and keyboard 16 (e.g., having a set of mechanical and/or electronic-based keys and/or a touch screen display). Device 10 may also have components such as cameras, microphones, speakers, buttons, status indicator lights, buzzers, sensors, and other input-output devices. These devices may be used to gather input for device 10 and may be used to supply a user of device 10 with output. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (e.g., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from an upper housing portion such as upper housing 12A and a lower housing portion such as lower housing 12B. Upper housing 12A may include display 14 and may sometimes be referred to as a display housing or lid. Lower housing 12B may sometimes be referred to as a base housing or main housing.

Housings 12A and 12B may be connected to each other using hinge structures located along the upper edge of lower housing 12B and the lower edge of upper housing 12A. For example, housings 12A and 12B may be coupled by hinges 26 such as hinges 26A and 26B that are located at opposing left and right sides of housing 12 along a rotational axis such as axis 22 (sometimes referred to herein as hinge axis 22). A slot-shaped opening such as opening 20 may be formed between upper housing 12A and lower housing 12B and may be bordered on either end by hinges 26A and 26B. Opening 20 may sometimes be referred to herein as gap 20 or slot 20 between upper housing 12A and lower housing 12B. Hinges 26A and 26B, which may be formed from conductive structures such as metal structures, may allow upper housing 12A to rotate about axis 22 in directions 24 relative to lower housing 12B. Slot 20 extends along the rear edge of lower housing 12B parallel to axis 22. The lateral plane of upper housing (lid) 12A and the lateral plane of lower housing 12B may be separated by an angle that varies between 0° when the lid is closed to 90°, 140°, 160°, or more when the lid is fully opened.

Figure 2:
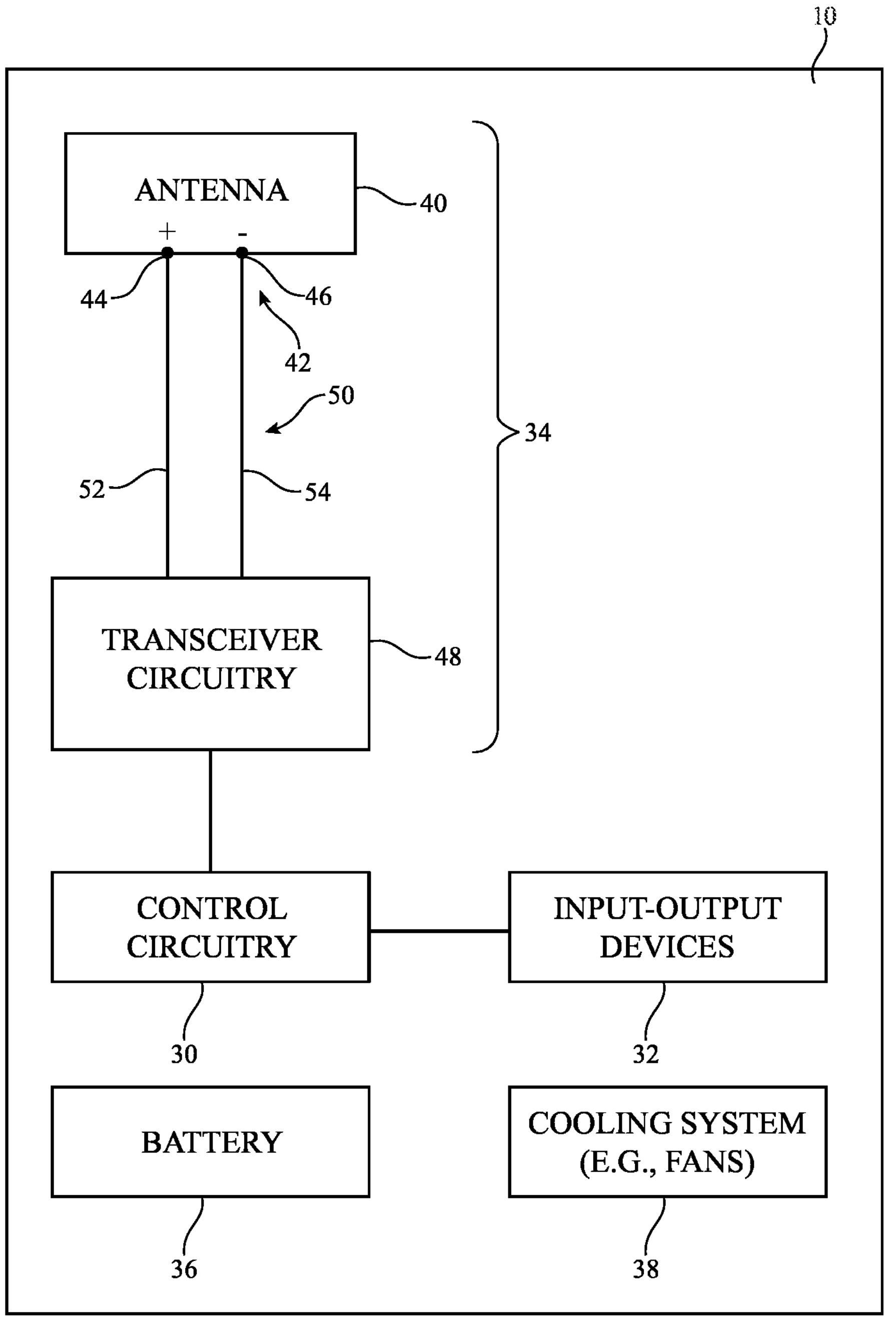
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry such as control circuitry 30. Control circuitry 30 may include storage and/or processing circuitry. Storage in control circuitry 30 may include hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 30 may be used to control the operation of device 10. This processing circuitry may include one or more microprocessors, microcontrollers, digital signal processors, host processors, baseband processor integrated circuits, application specific integrated circuits, central processing units (CPUs), graphics processing units (GPUs), etc. Control circuitry 30 may be configured to perform operations in device 10 using hardware (e.g., dedicated hardware or circuitry), firmware, and/or software. Software code for performing operations in device 10 may be stored on control circuitry 30 (e.g., storage in control circuitry 30 may include non-transitory (tangible) computer readable storage media that stores the software code). The software code may sometimes be referred to as program instructions, software, data, instructions, or code. Software code stored on the storage may be executed by processing circuitry in control circuitry 30.

Control circuitry 30 may be used to run software on device 10 such as internet browsing applications, voice-over-internet-protocol (VOIP) telephone call applications, email applications, media playback applications, operating system functions, etc. To support interactions with external equipment, control circuitry 30 may be used in implementing communications protocols. Communications protocols that may be implemented using control circuitry 30 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers, proximity sensors, and other sensors and input-output components.

Device 10 may include wireless communications circuitry 34 that allows control circuitry 30 of device 10 to communicate wirelessly with external equipment. The external equipment with which device 10 communicates wirelessly may be a computer, a cellular telephone, a watch, a router, access point, or other wireless local area network equipment, a wireless base station in a cellular telephone network, a display, a head-mounted device, or other electronic equipment. Wireless communications circuitry 34 may include radio-frequency (RF) transceiver circuitry 48 and one or more antennas such as antenna 40. Configurations in which device 10 contains a single antenna may sometimes be described herein as an example. In general, device 10 may include any number of antennas.

Transceiver circuitry 48 may support communications in Extremely High Frequency (EHF) or millimeter wave communications bands between about 30 GHz and 300 GHz, in centimeter wave communications bands between about 10 GHz and 30 GHz (sometimes referred to as Super High Frequency (SHF) bands), wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as "bands," and may span corresponding ranges of frequencies. Transceiver circuitry 48 may include one or more integrated circuits, power amplifier circuitry, low-noise input amplifiers, passive radio-frequency components, switching circuitry, transmission line structures, and other circuitry for handling radio-frequency signals.

If desired, device 10 may be supplied with a battery such as battery 36. Control circuitry 30, input-output devices 32, wireless communications circuitry 34, and power management circuitry associated with battery 36 may produce heat during operation. To ensure that these components are cooled satisfactorily, device 10 may be provided with a cooling system such as cooling system 38. Cooling system 38, which may sometimes be referred to as a ventilation system, may include one or more fans and other equipment for removing heat from the components of device 10. Cooling system 38 may include structures that form airflow ports (e.g., openings in ventilation port structures located along slot 20 of FIG. 1 or other portions of device 10 through which cool air may be drawn by one or more cooling fans and through which air that has been warmed from heat produced by internal components may be expelled). Airflow ports, which may sometimes be referred to as cooling ports, ventilation ports, air exhaust and entrance ports, etc., may be formed from arrays of openings in plastic ventilation port structures or other structures associated with cooling system 38.

Radio-frequency transceiver circuitry 48 and antenna(s) 40 may be used to handle one or more radio-frequency communications bands. For example, circuitry 48 may include wireless local area network transceiver circuitry that may handle a 2.4 GHz band for WiFi® and/or Bluetooth® communications and, if desired, may include 5 GHz transceiver circuitry (e.g., for WiFi®). If desired, transceiver circuitry 48 and antenna(s) 40 may handle communications in other bands (e.g., cellular telephone bands, near field communications bands, bands at millimeter wave frequencies, etc.).

Transceiver circuitry 48 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, dielectric resonator antennas, hybrids of these designs, etc. If desired, one or more of antennas 40 may be cavity-backed antennas. Different types of antennas may be used for different bands and combinations of bands. If desired, antennas 40 may be arranged in one or more phased antenna arrays.

As shown in FIG. 2, transceiver circuitry 48 in wireless communications circuitry 34 may be coupled to antennas such as antenna 40 using radio-frequency transmission line paths such as transmission line 50. Transmission line paths in device 10 such as transmission line 50 may include coaxial cables, microstrip transmission lines, stripline transmission lines, edge-coupled microstrip transmission lines, edge-coupled stripline transmission lines, waveguide transmission lines (e.g., coplanar waveguides, grounded coplanar waveguides, etc.), transmission lines formed from combinations of transmission lines of these types, etc.

Transmission line paths in device 10 such as transmission line 50 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Transmission line 50 in device 10 may be coupled to antenna feed 42 of antenna 40. Antenna 40 of FIG. 2 may, for example, form an inverted-F antenna, a planar inverted-F antenna, a slot antenna, a hybrid inverted-F slot antenna or other antenna having an antenna feed such as antenna feed 42 with a positive antenna feed terminal such as positive antenna feed terminal 44 and a ground antenna feed terminal such as ground antenna feed terminal 46. Transmission line 50 may include a positive transmission line conductor 52 (sometimes referred to herein as signal conductor 52) and a ground transmission line conductor 54 (sometimes referred to herein as ground conductor 54). Signal conductor 52 may be coupled to positive antenna feed terminal 44 and ground conductor 54 may be coupled to ground antenna feed terminal 46. Other types of antenna feed arrangements may be used (e.g., indirect feed arrangements, feed arrangements in which antenna 40 is fed using multiple feeds, etc.) and multiple antennas 40 may be provided in device 10, if desired. The feeding configuration of FIG. 2 is merely illustrative.

Filter circuitry, switching circuitry, impedance matching circuitry, and other circuitry may be interposed within transmission line 50, in or between parts of antenna 40, or in other portions of wireless communications circuitry 34, if desired. Control circuitry 30 may be coupled to transceiver circuitry 48 and input-output devices 32. During operation, input-output devices 32 may supply output from device 10 and may receive input from sources that are external to device 10. Control circuitry 30 may use wireless communications circuitry 34 to transmit and receive wireless signals.

Figure 3:
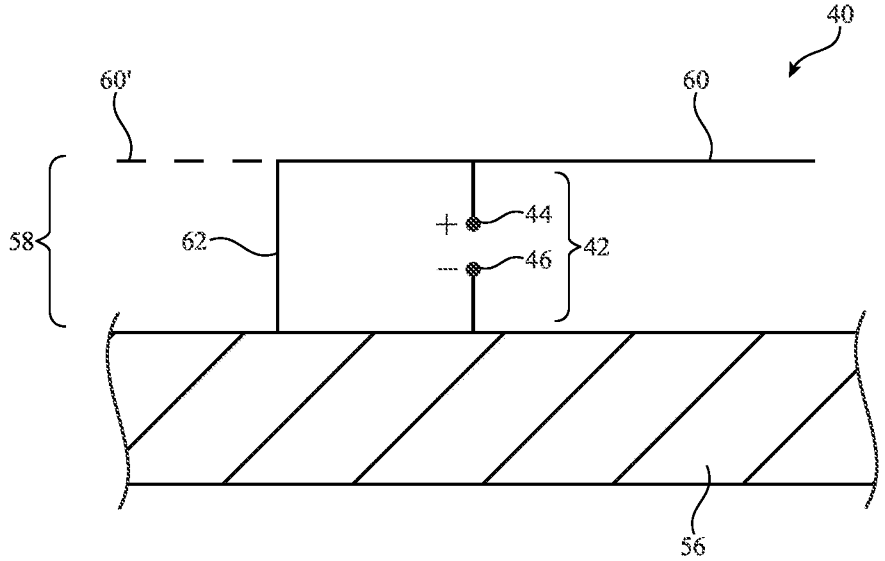
FIG. 3 is a diagram of an illustrative antenna in accordance with some embodiments.

FIG. 3 is a schematic diagram of an illustrative antenna for device 10. In the example of FIG. 3, antenna 40 is an inverted-F antenna having antenna resonating element 58 (e.g., an inverted-F antenna resonating element) and antenna ground 56 (sometimes referred to herein as ground plane 56, ground structures 56, antenna ground structures 56, or ground 56). Antenna resonating element 58 (sometimes referred to herein as antenna radiating element 58, resonating element 58, or radiating element 58) may have one or more antenna resonating element arms such as arm 60. If desired, antenna resonating element 58 may have multiple branches (e.g., a first branch formed from a first arm 60, a second branch formed from a second arm 60', etc.). The lengths of each of the arms (branches) of antenna resonating element 58 may be selected to support communications band resonances at desired frequencies (e.g., a high band resonance may be supported using a shorter branch such as second arm 60' and a low band resonance may be supported using a longer branch such as first arm 60). Second arm 60' may therefore sometimes be referred to herein as high band arm 60' and first arm 60 may sometimes be referred to herein as low band arm 60. Antenna resonances may also be produced from resonating element harmonics and/or using parasitic antenna resonating elements.

As shown in FIG. 3, antenna resonating element 58 may be coupled to antenna ground 56 by return path 62. Antenna feed 42 may be coupled between one of the arms 60 of antenna and antenna ground 56 in parallel with return path 62. Positive antenna feed terminal 44 may be coupled to one of the arms 60 of antenna 40. Ground antenna feed terminal 46 may be coupled to antenna ground 56. Antenna ground 56 may be formed from metal portions of housing 12 (e.g., portions of lower housing 12B of FIG. 1), metal traces on a printed circuit or other carrier/substrate, internal metal bracket members, sheet metal members, metal foil, and/or other conductive structures in device 10. This example is merely illustrative and in general, antenna 40 may include an antenna resonating element having any desired shape and architecture.

Figure 4:
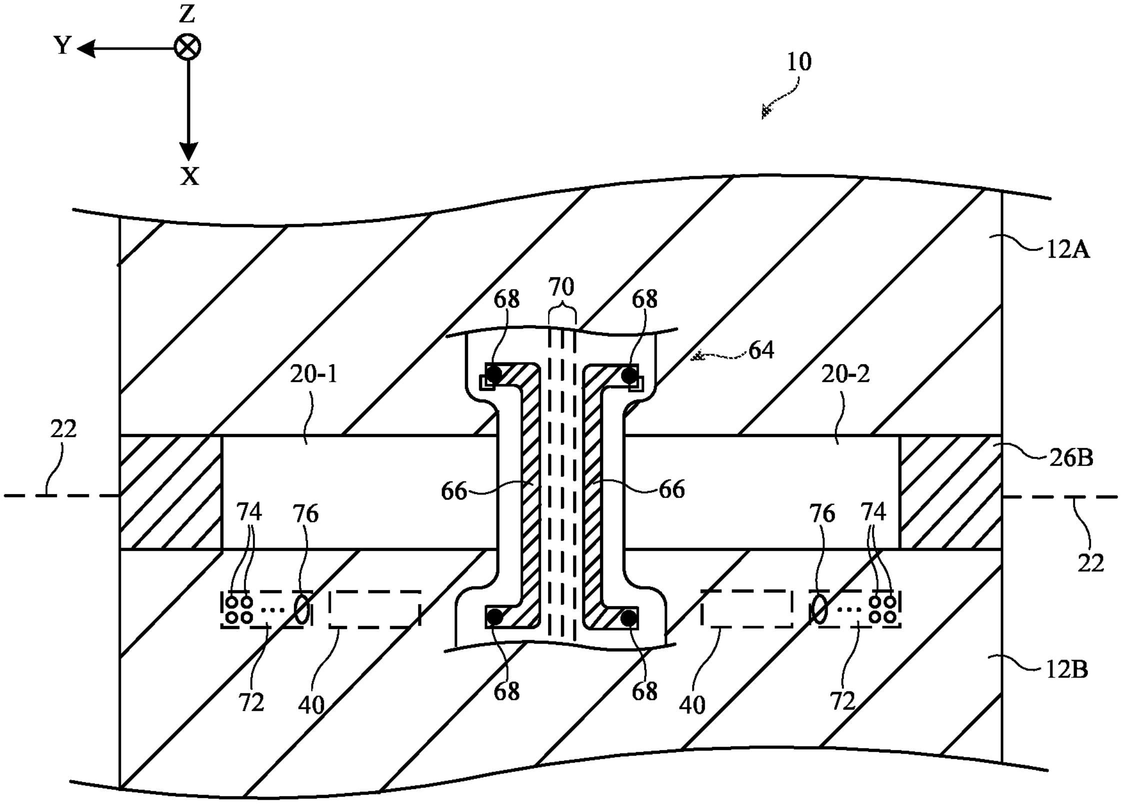
FIG. 4 is a diagram showing hinge and flexible printed circuit structures bridging a gap between upper and lower housings in a laptop computer of the type shown in FIG. 1 in accordance with some embodiments.

Metal traces on one or more flexible printed circuits may bisect slot 20 of FIG. 1. Consider, for example, the illustrative configuration of device 10 that is shown in FIG. 4 (e.g., a configuration in which upper housing 12A is folded as far open with respect to lower housing 12B about axis 22 such that housings 12A and 12B lie in the same (e.g., X-Y) plane or in nearly the same plane). In the example of FIG. 4, upper housing 12A is separated from lower housing 12B by air-filled slot 20. Hinges 26A and 26B may be coupled between housings 12A and 12B along the respective left and right edges of device 10. One or more flexible printed circuits such as flexible printed circuit 64 may bisect slot 20 along the length of slot 20, thereby creating two slots (i.e., two separate slot-shaped portions of slot 20) such as slots 20-1 and 20-2. Flexible printed circuit 64 may contain one or more sheets of flexible dielectric substrate material such as a layer of polyimide or a sheet of other flexible polymers.

Flexible printed circuit 64 may include signal lines 70 for routing display signals (i.e., data signals associated with displaying images on display 14 of FIG. 1) and other signals (e.g., camera signals, backlight signals, power signals, touch sensor signals, etc.) between upper housing 12A and lower housing 12B. Ground traces 66 may be provided on the outer edges of flexible printed circuit 64 (i.e., in flexible printed circuit 64, signal lines 70 may be flanked on opposing sides by ground traces 66). Ground traces 66 may be formed from copper or other metal and may have any suitable widths (e.g., 1 mm to 3 mm, less than 1 mm, more than 1 mm, etc.).

Ground traces 66 may be shorted to metal in housings 12A and 12B using screws, other fasteners, welds, conductive adhesive, solder, or other conductive coupling mechanism (see, e.g., conductive ground connections 68).

With this type of arrangement, slots (openings) 20-1 and 20-2 may be surrounded by metal. For example, slots 20-1 and 20-2 may be surrounded by metal portions of upper housing 12A and lower housing 12B on their top and bottom edges. Hinges 26A and 26B and ground traces 66 may also be formed from metal and may help define the shapes of slots 20-1 and 20-2. As shown in FIG. 4, slot 20-1 may have a left edge formed by hinge 26A and an opposing right edge formed from the ground traces on flexible printed circuit 64. Slot 20-2 may have a left edge formed from flexible printed circuit 64 and an opposing right edge formed from hinge 26-B. The example of FIG. 4 in which one flexible printed circuit divides slot 20 into two separate slots is merely illustrative. If desired, two or more flexible printed circuits may divide slot 20 into three or more separate slots. Two or more separate flexible printed circuits may divide slot into two separate slots 20-1 and 20-2 if desired (e.g., two or more separate flexible printed circuits may be interposed between slots 20-1 and 20-2).

During wireless operation of device 10, slots 20-1 and 20-2 may serve as antenna apertures for respective electrically isolated antennas 40 in lower housing 12B of device 10. For example, a first antenna 40 may be mounted within lower housing 12B and aligned with slot 20-1 and a second antenna 40 may be mounted within lower housing 12B and aligned with slot 20-2. Conductive structures in lower housing 12B may form cavity structures for each of the antennas 40 (e.g., cavity-shaped ground structures or other ground structures that form part of antenna ground 56 of FIG. 3). By aligning antennas 40 with separate slots between lower housing 12B and upper housing 12A in device 10, the antennas may exhibit sufficient electrical isolation from each other (e.g., such that the antennas may be used to form a multiple-input-multiple-output (MIMO) antenna array at 2.4 GHz and/or 5 GHz and/or other suitable frequencies for wireless local area network communications, etc.).

Device 10 may have speaker structures such as speakers 72 mounted along the rear edge of lower housing 12B or elsewhere in device 10. Speakers 72 may each include a speaker driver, a speaker cavity (e.g., one or more acoustic cavities or chambers that amplify or alter sound waves to optimize the audio response of sound emitted by the speaker), and/or any other components for producing audible sound. Each speaker 72 may include one or more speaker ports 74. Speaker ports 74 may include one or more openings in the conductive material of lower housing 12B that allow sound produced by speakers 72 to escape from the interior of lower housing 12B to be heard by a user.

If desired, additional portions of lower housing 12B may be configured to form supplemental acoustic cavities or chambers for speakers 72 that help to optimize the audio response of speakers 72. As space is at a premium in compact devices such as device 10, portions of other components in lower housing 12B may also be used to form supplemental acoustic cavities or chambers for speakers 72. While each speaker 72 includes a cavity or chamber for emitting sound via speaker ports 74, a portion of the antenna 40 at or adjacent to each speaker 72 may form a supplemental acoustic cavity or chamber for the speaker. In these arrangements, speaker 72 may include an additional speaker port 76 at/facing antenna 40. A portion of the acoustic (audio) sound waves produced by speaker 72 (e.g., by the speaker driver for speaker 72) may pass, via speaker port 76, into and out of the portion of antenna 40 that forms the supplemental acoustic cavity or chamber for speaker 72 (e.g., prior to the sound waves escaping lower housing 12B via speaker ports 74). The shape and materials used to form the portion of antenna 40 that forms the supplemental acoustic cavity or chamber for speaker 72 may be selected to alter one or more characteristics of the sound waves so as to optimize the audible response of the sound waves to a user (e.g., altering an equalizer response of the sound waves, filtering the sound waves, altering a volume or amplitude of the sound waves, altering a directionality of the sound waves when emitted from speaker ports 74, etc.). In this way, the volume of antenna 40 may help to optimize the audio response of speaker 72 while also contributing to the radio-frequency performance of the antenna, thereby minimizing volume consumption within lower housing 12B.

Figure 5:
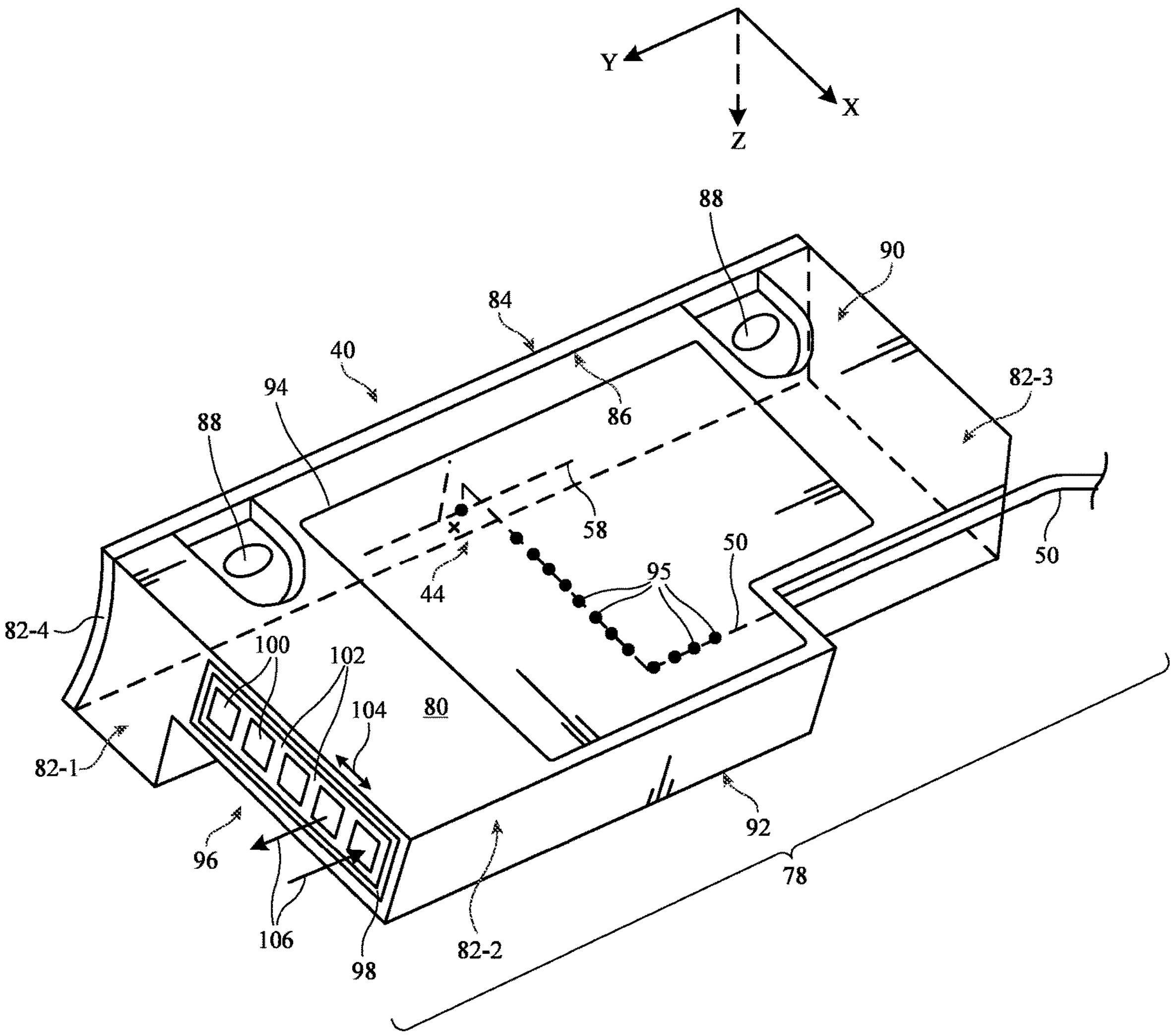
FIG. 5 is a rear perspective view of an illustrative antenna module for mounting in a lower laptop computer housing in accordance with some embodiments.

Each antenna 40 in lower housing 12B may be integrated within a corresponding antenna module. The antenna module may also be used to form a supplemental acoustic cavity or chamber for an adjacent speaker 72. FIG. 5 is a rear perspective view of an antenna module that is used to form a supplemental acoustic cavity or chamber for an adjacent speaker 72.

As shown in FIG. 5, antenna 40 may be integrated into a corresponding antenna module 78. Antenna module 78 may include one or more dielectric substrates that surround and enclose a cavity such as cavity 80. Cavity 80 may be filled with air (e.g., cavity 80 may be an air cavity that is enclosed within antenna module 78). For example, antenna module 78 may have dielectric sidewalls 82 that define respective edges of cavity 80 (e.g., at least a first sidewall 82-1, a second sidewall 82-2, a third sidewall 82-3 opposite first sidewall 82-1, and a fourth sidewall 82-4 opposite second sidewall 82-2). Antenna module 78 may also have a dielectric bottom (lower) wall 90 and an opposing dielectric top (upper) wall 92 that define respective edges of cavity 80. Sidewalls 82 may couple bottom wall 90 to top wall 92 and may extend around the lateral periphery of bottom wall 90 and top wall 92.

Sidewalls 82-1, 82-2, 82-3, and 82-4, bottom wall 90, and top wall 92 may be formed from different dielectric substrates or, if desired, two or more of sidewalls 82-1, 82-2, 82-3, and 82-4, bottom wall 90, and top wall 92 may be formed from integral portions of the same dielectric substrate. The dielectric substrate(s) may include plastic (e.g., LDS plastic, injection molded plastic, etc.), epoxy, adhesives, ceramics, rubber, polymers, glass, and/or any other desired dielectric materials. One or more attachment structures 88 (e.g., mounting holes for receiving screws, pins, or other mounting structures) may be integrated within antenna a module 78 (e.g., at least bottom wall 90) to help secure antenna module 78 within lower housing 12B (FIG. 1).

Sidewall 82-4 may have an interior surface 86 (within cavity 80) and an opposing exterior surface 84 (at the exterior of antenna module 78). Antenna 40 may be integrated into antenna module 40. As shown in FIG. 5, antenna resonating element 58 may be disposed within cavity 80 on interior surface 86 of sidewall 82-4. Antenna resonating element 58 may be formed from conductive traces that are patterned onto interior surface 86 or onto a flexible printed circuit that is layered onto interior surface 86 or may be formed from sheet metal or metal foil layered onto interior surface 86, as examples. Transmission line 50 may run along sidewall 82-2 and may pass into the interior of antenna module 78 through a hole in sidewall 82-2. Transmission line 50 may then extend through cavity 80 along bottom wall 90 and may be coupled to positive antenna feed terminal 44 of antenna resonating element 58.

Conductive material may be disposed on the exterior surface(s) of one or more of sidewalls 82-1, 82-2, 82-3, bottom wall 90, and top wall 92 (e.g., the conductive material may cover sidewalls 82-1, 82-2, and 82-3, bottom wall 90, and top wall 92). The conductive material may be held at a ground potential and may form part of the antenna ground for antenna 40 if desired. The conductive material may include conductive traces (e.g., LDS traces) patterned onto the plastic material in sidewalls 82-1, 82-2, and 82-3, bottom wall 90, and top wall 92. The conductive material may form conductive cavity walls that configure cavity 80 to form an electromagnetic cavity back for antenna 40 (e.g., antenna 40 may be a cavity-backed antenna having an antenna cavity formed from cavity 80 and the conductive material on the walls of antenna module 78). The conductive material on different walls of antenna module 78 may be mechanically and electrically coupled together using solder (e.g., a ring of solder extending around the periphery of one or more of the walls) or other conductive adhesives. The solder may help to form an electromagnetic seal for cavity 80. Antenna resonating element 58 may convey radio-frequency signals through the dielectric material in sidewall 82-4 (e.g., sidewall 82-4 may be free from conductive traces). Cavity 80 may help to maximize the gain, radiation pattern (e.g., directivity), and/or antenna efficiency for antenna 40.

The conductive material on the walls of antenna module 78 may include a conductive plate 94 that is disposed on or within bottom wall 90 of antenna module 78. Conductive plate 94 may include stainless steel or other metal materials (e.g., conductive plate 94 may be formed from stamped sheet metal). Conductive plate 94 may be embedded (e.g., injection-molded) into bottom wall 90, for example. Conductive plate 94 may help to provide mechanical strength to antenna module 78 and may help to support transmission line 50 as the transmission line passes from the exterior of antenna module 78 to positive antenna feed terminal 44. Transmission line 50 may be soldered to conductive plate 94 (e.g., using solder 95) along its length within cavity 80. This may help to secure transmission line 50 in place while also holding the ground conductor of the transmission line at a consistent ground potential along its length, thereby optimizing the radio-frequency performance of antenna 40.

As shown in FIG. 5, antenna module 78 may also include a port structure such as port structure 96 that acoustically couples cavity 80 in antenna module 78 to an adjacent speaker 72 (FIG. 4). Cavity 80 may form a supplemental acoustic cavity or chamber for speaker 72. Port structure 96 may include one or more vents 100. Vents 100 may be formed from air-filled slots, ducts, ports, holes, or openings in sidewall 82-1. Vents 100 may allow air to pass into and out of cavity 80, as shown by arrows 106. Vents 100 and port structure 96 may be aligned with the speaker port 76 of an adjacent speaker 72 (FIG. 4). Port structure 96 may sometimes also be referred to herein as speaker bypass 96.

Speaker 72 may be mounted, affixed, adhered, secured, or pressed against antenna module 78. Port structure 96 may include a gasket such as gasket 98 that extends around vents 100. Gasket 98 may press against speaker 72 around speaker port 76 and may form an air-tight seal around speaker port 76 and vents 100. The dielectric material in sidewalls 82-1, 82-2, 82-3, and 82-4, bottom wall 90, and top wall 92 may be affixed together using ultrasonic welds, interlocking structures, injection molding, adhesive, or other structures that mechanically and acoustically seal cavity 80 from the exterior of antenna module 78 at locations other than port structure 96. This may allow sound (e.g., acoustic/sound waves conveyed in air) to pass from speaker 72, through speaker port 76, and through vents 100 into cavity 80 (as shown by arrows 106) without leaking outside of speaker 72 or cavity 80. At least a portion of the sound waves may pass into cavity 80 and out of cavity 80 back into speaker 72, which passes the sound waves through speaker ports 74 (FIG. 4) to be heard by a user. The shape of cavity 80 and the materials used to form antenna module 80 (e.g., conductive plate 94, sidewalls 82, etc.) may be selected to tune the acoustic response of the sound waves that pass through speaker ports 74. Using ultrasonic welds to adhere the plastic material in the walls of antenna module 78 together may form a more robust acoustic seal for cavity 80 than using glue, for example.

Sidewall 82-1 of antenna module 78 may include ribs 102 that separate vents 100 in port structure 96. Ribs 102 may be separated or spaced apart from each other by pitch 104. Ribs 102 may be covered with conductive material (e.g., LDS traces). The width of vents 100 and pitch 104 may be selected to configure port structure 96 to be transparent to acoustic (sound) waves while concurrently being opaque to radio-frequency signals at the frequencies conveyed by antenna 40. Pitch 104 may, for example, be low enough to allow a sufficient amount of air to pass through vents 100 to optimize the acoustic response of the speaker, while also being significantly wider than the wavelengths of operation of antenna 40 so the radio-frequency signals conveyed by antenna 40 interact with port structure 96 as if port structure 96 were a continuous sheet of metal. Pitch 104 may be 1-3 mm, 1.5-2.5 mm, 2 mm, 1-5 mm, or other pitches, for example.

This may allow port structure 96 to form an acoustic coupling (e.g., an acoustic interface) that passes sound waves between speaker 72 and cavity 80 while concurrently forming a sealed electromagnetic cavity for the radio-frequency signals conveyed by antenna 40 (e.g., thereby allowing cavity 80 to optimize the radio-frequency performance of antenna 40). In this way, cavity 80 may help to optimize the audio response of speaker 72 while also serving as a cavity back for antenna 40 that optimizes the radio-frequency performance of antenna 40, thereby minimizing space consumption in device 10. Cavity 80 may therefore sometimes be referred to herein as acoustic chamber 80, acoustic cavity 80, supplemental acoustic chamber 80, supplemental acoustic cavity 80, antenna cavity 80, or combined acoustic and antenna cavity 80.

The example of FIG. 5 is merely illustrative. In general, antenna module 78 may include any desired number of walls having any desired shapes (e.g., planar shapes, non-planar shapes, curved shapes, etc.). Port structure 96 may be formed in any of the walls of antenna module 78 (e.g., depending on the location of the adjacent speaker 72). Conductive plate 94 may be integrated into top wall 92 instead of bottom wall 90 if desired. Additional conductive plates may be provided on any desired walls of antenna module 78. More than one antenna 40 may be disposed within cavity 80 if desired. Cavity 80 may have any desired shape (e.g., a shape that optimizes both the radio-frequency performance of antenna 40 and the acoustic properties of speaker 72).

Figure 6:
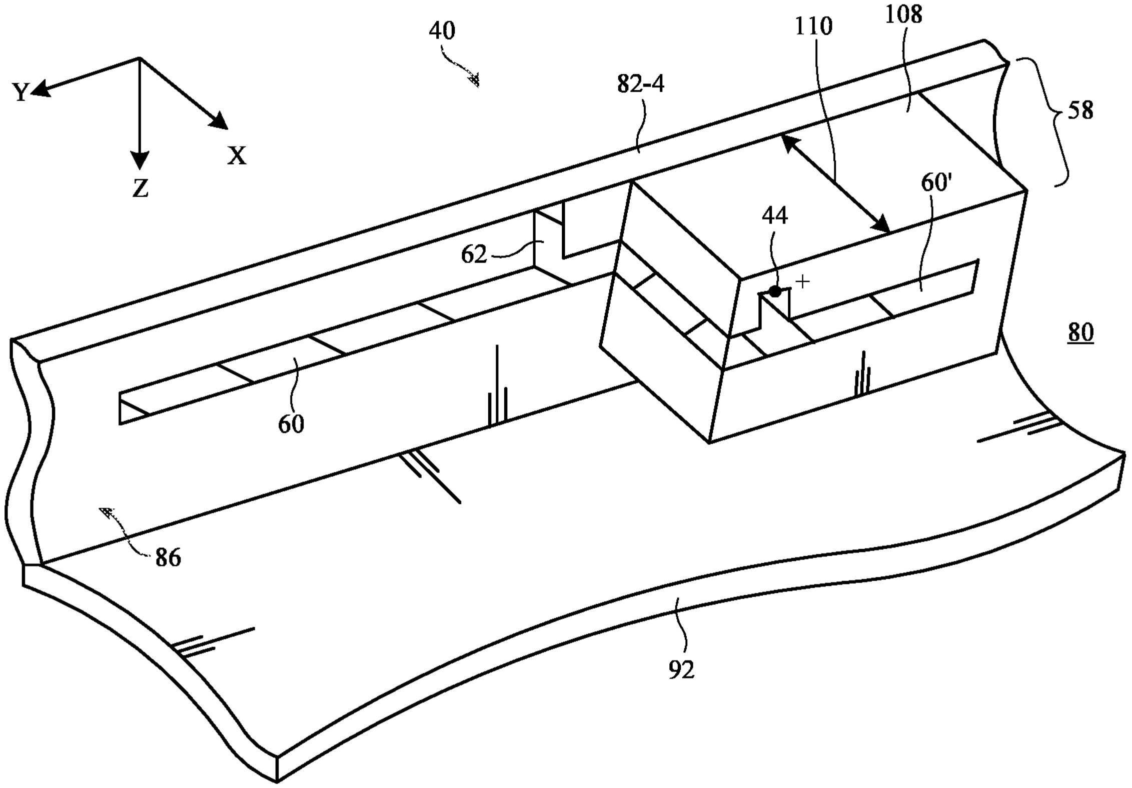
FIG. 6 is a rear interior perspective view of an illustrative antenna module having an antenna resonating element disposed in a cavity in accordance with some embodiments.

FIG. 6 is an interior view showing how antenna 40 may be disposed within cavity 80 of antenna module 78 (e.g., with bottom wall 90 of FIG. 5 removed for the sake of clarity). As shown in FIG. 6, low band arm 60 and return path 62 of antenna resonating element 58 may be disposed on interior surface 86 of sidewall 82-4 (within cavity 80). Return path 62 may be coupled to conductive plate 94 or other conductive material on bottom wall 90 (FIG. 5) (e.g., using solder).

A support structure such as support structure 108 may be mounted to interior surface 86 of sidewall 82-4 (within cavity 80). Support structure 108 may be formed from plastic, foam, glass, ceramic, polymer, or other dielectric materials. Support structure 108 may sometimes be referred to herein as dielectric spacer 108, substrate 108, antenna carrier 108, or shim 108. High band arm 60' of antenna resonating element 58 may extend from low band arm 60 on sidewall 82-4 and onto support structure 108 (e.g., high band arm 60' may have a first portion disposed on support structure 108 and extending parallel to the X-axis and may have a second portion disposed on support structure 108 and extending parallel to the Y-axis of FIG. 6, where the second portion is disposed on the side of support structure 108 opposite to interior surface 86 of sidewall 82-4). Positive antenna feed terminal 44 may be coupled to high band arm 60' on support structure 108 (e.g., on the side of support structure 108 opposite to sidewall 82-4).

Low band arm 60 may be formed from a conductive trace patterned onto interior surface 86 and high band arm 60' may be formed from a conductive trace patterned onto support structure 108 (e.g., using an LDS process), low band arm 60 may be adhered to interior surface 86 and high band arm 60' may be adhered to support structure 108 using adhesive, or low band arm 60 and high band arm 60' may be formed from conductive traces on a flexible printed circuit that is layered over support structure 108 and interior surface 86, as examples. Support structure 108 may have a width 110 that is selected to offset (displace) high band arm 60' and positive feed terminal 44 further into cavity 80 than low band arm 60. This may serve to optimize the radio-frequency performance of antenna 40 in the frequency band of high band arm 60' without impacting the radio-frequency performance of low band arm 60. High band arm 60' may, for example, operate in a 5 GHz Wi-Fi band whereas low band arm 60' operates in a 2.4 GHz Wi-Fi/WPAN band. Width 110 may be 0.5-5 mm, 1-10 m, 0.2-4 mm, greater than 1 mm, less than m, less than 5 mm, greater than 0.5 mm, or other values, as examples.

The example of FIG. 6 is merely illustrative. Antenna resonating element 58 may have any desired number of arms that have any desired shape and that follow any desired paths. Some of antenna resonating element 58 may extend onto other walls of antenna module 78 within cavity 80 if desired. In other implementations, support structure 108 may be omitted and sidewall 82-4 may have a first portion with a first thickness and a second portion with a second thickness greater than the first thickness (e.g., where the second thickness is greater than the first thickness by width 110). In these implementations, low band arm 60 and return path 62 may be disposed on the first portion and high band arm 60' and positive antenna feed terminal 44 may be disposed on the second portion of sidewall 82-4 (e.g., where positive antenna feed terminal 44 and high band arm 60' are disposed by width 110 further into cavity 80 than low band arm 60 and return path 62).

Figure 7:
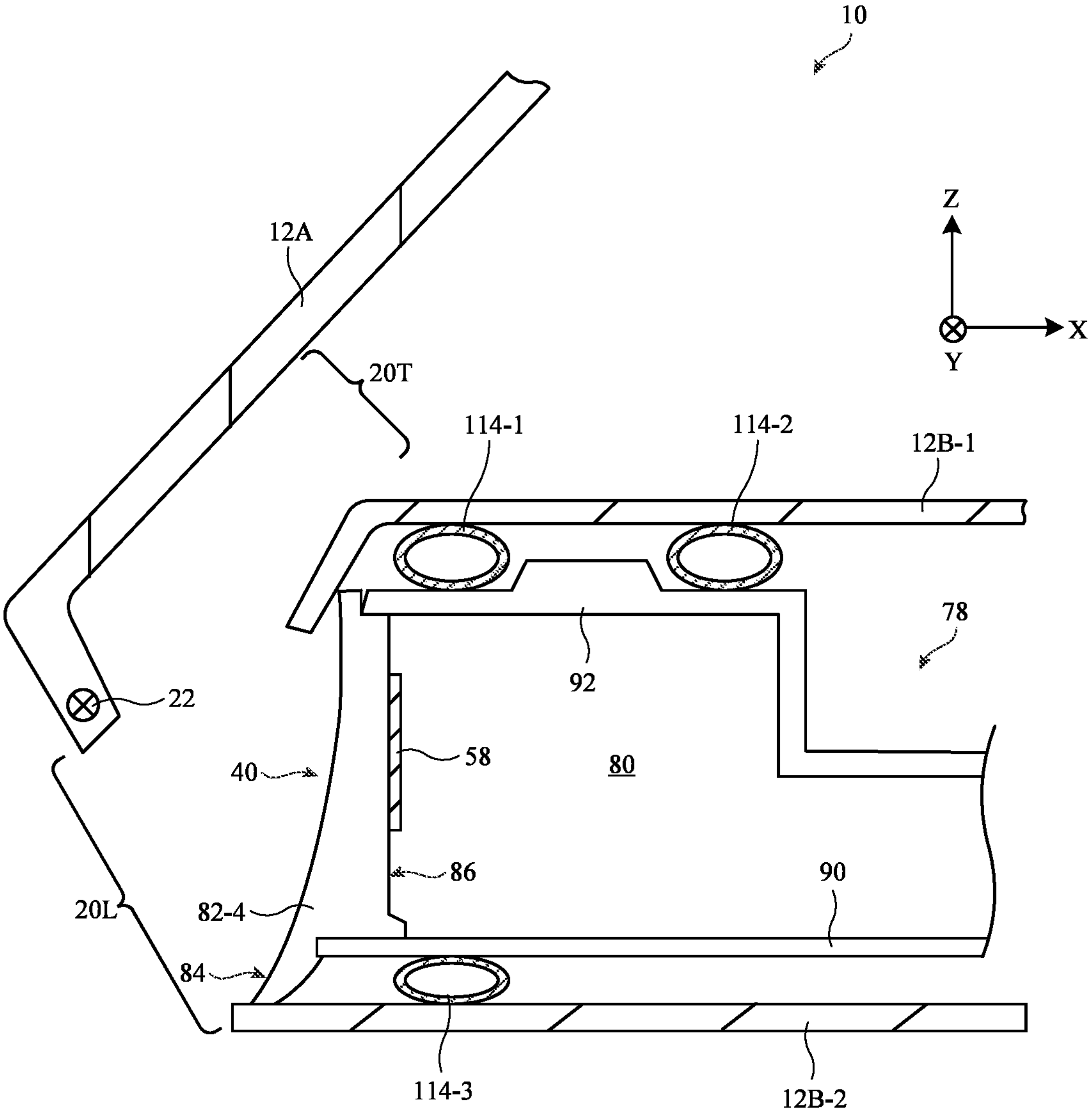
FIG. 7 is a cross-sectional side view of an illustrative laptop computer showing how the antenna module of FIGS. 5 and 6 may be mounted within a lower housing of the laptop computer in accordance with some embodiments.

FIG. 7 is a cross-sectional side view of device 10 in the vicinity of the rear edge of lower housing 12B, illustrating how antenna module 78 may be mounted within lower housing 12B. As shown in FIG. 7, lower housing 12B has conductive upper wall 12B-1 and conductive lower wall 12B-2. Antenna module 78 may be mounted along the rear edge of lower housing 12B between conductive upper wall 12B-1 and conductive lower wall 12B-2 (e.g., within an interior cavity of lower housing 12B).

When mounted within lower housing 12B, top wall 92 of antenna module 78 may face conductive upper wall 12B-1 and bottom wall 90 of antenna module 78 may face conductive lower wall 12B-2. Sidewall 82-4 may extend from conductive upper wall 12B-1 to conductive lower wall 12B-2 and may help to seal the interior of lower housing 12B from external contaminants. Top wall 92 and bottom wall 90 may be attached to sidewall 82-4 via acoustic welds and/or injection-molding, for example. This may help to create a strong electromagnetic and acoustic seal for cavity 80. Exterior surface 84 of sidewall 82-4 may face the exterior of lower housing 12B. Interior surface 86 of sidewall 82-6 may face and define an edge of cavity 80 within antenna module 78. Antenna resonating element 58 may be disposed at interior surface 86 of sidewall 82-6 (e.g., antenna resonating element 58 may be patterned directly onto interior surface 86 and/or may be disposed on support structure 108 of FIG. 6, which has been omitted from FIG. 7 for the sake of clarity).

As shown in FIG. 7, the lateral surface of conductive upper wall 12B-1 may extend parallel or substantially parallel (e.g., within 30 degrees) to the lateral surface of conductive lower wall 12B-2. Conductive upper wall 12B-1 and conductive lower wall 12B-2 may define the interior of lower housing 12B. A main logic board, battery 36 (FIG. 2), a set of input-output devices 32, cooling system 38, transceiver circuitry 48, control circuitry 30, speaker 72, and other desired components (not shown in FIG. 7) may be mounted within the interior of lower housing 12B. By mounting antenna module 78 in this way, an entirety of the antenna resonating element 58 and antenna module 78 may be interposed between conductive upper wall 12B-1 and conductive lower wall 12B-2 within the interior of lower housing 12B. This may, for example, hide antenna 40 from view of a user at the exterior of device 10 and may protect antenna 40 from contaminants or damage.

Components such as keyboard 16 and track pad 18 (FIG. 1) may operate through openings in conductive upper wall 12B-1. Speaker ports 74 (FIG. 4) may also be formed in conductive upper wall 12B-1. Conductive lower wall 12B-2, which may be joined to conductive upper wall 12B-1 around the lateral periphery of lower housing 12B (e.g., such that conductive material surrounds the interior cavity and thus antenna module 78), may have feet or other support structures that allow device 10 to rest on a tabletop, a user's lap, or other support structure during operation.

Lower housing 12B may be separated from upper housing 12A by opening 20 of FIG. 4. Opening 20 may include a lower opening 20L between the conductive material of upper housing 12A and conductive lower wall 12B-2 of lower housing 12B (e.g., when upper housing 12A is in a closed-lid configuration) and/or may include both lower opening 20L and an upper opening 20T between the conductive material of upper housing 12A and conductive upper wall 12B-1 of lower housing 12B (e.g., when upper housing 12A is in an open lid configuration). Antenna 40 may convey radio-frequency signals through upper opening 20T and/or lower opening 20L.

Conductive upper wall 12B-1 may be electrically coupled to conductive lower wall 12B-2 through antenna module 78 and conductive gaskets 114. For example, lower housing 12B may include a first conductive gasket 114-1 that couples conductive material (e.g., grounded conductive traces) on top wall 92 of antenna module 78 to conductive upper wall 12B-1 (e.g., at or adjacent to antenna resonating element 58). Lower housing 12B may also include a second conductive gasket 114-2 that couples conductive material (e.g., grounded conductive traces) on top wall 92 of antenna module 78 to conductive upper wall 12B-1 (e.g., at a location that is farther towards the interior of lower housing 12B than first conductive gasket 114-1). Coupling antenna module 78 to conductive upper wall 12B-1 using both conductive gaskets 114-1 and 114-2 and disposing conductive gasket 114-1 at a location overlapping antenna resonating element 58 may allow conductive material (e.g., grounded conductive traces) between conductive gaskets 114-1 and 114-2 to be removed or omitted from top wall 92, effectively increasing the volume of antenna 40 and thus the antenna efficiency of antenna 40 (e.g., where part of the electromagnetic cavity for antenna 40 is defined by the portion of conductive upper wall 12B-1 between conductive gaskets 114-1 and 114-2).

Lower housing 12B may also include a third conductive gasket 114-3 that couples conductive material (e.g., grounded conductive traces) on bottom wall 90 of antenna module 78 to conductive lower wall 12B-2 (e.g., overlapping antenna resonating element 58). The conductive material on antenna module 78 and conductive gaskets 114-1, 114-2, and 114-3 may form an electrical (e.g., grounded) path from conductive upper wall 12B-1 to conductive lower wall 12B-2. Gaskets 114-1, 114-2, and 114-3 may therefore also help to extend the antenna ground for antenna 40 to also include conductive upper wall 12B-1 and conductive lower wall 12B-2. Gaskets 114 may be formed from conductive foam, conductive fabric, adhesive, and/or other conductive structures (e.g., elastomeric structures that can expand outwardly against nearby structures after being compressed). Gaskets 114 may thereby help to optimize the radio-frequency performance of antenna 40 while also helping to mechanically secure (e.g., adhere) antenna module 78 to lower housing 12B and helping to seal the interior of lower housing 12B from external contaminants.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a speaker having a speaker port and a speaker cavity; and an antenna module having a first dielectric wall that defines a first edge of an antenna cavity, a second dielectric wall that defines a second edge of the antenna cavity, an antenna resonating element disposed on the first dielectric wall within the antenna cavity;

a positive antenna feed terminal coupled to the antenna resonating element; and vents in the second dielectric wall, the vents being aligned with the speaker port, the speaker being configured to emit sound waves, and the vents being configured to convey a portion of the sound waves into and out of the antenna cavity.

2. The electronic device of claim 1, wherein the antenna module has a third dielectric wall that defines a third edge of the antenna cavity.

3. The electronic device of claim 2, further comprising:

a metal sheet embedded in the third dielectric wall.

4. The electronic device of claim 3, further comprising:

a transmission line that extends within the antenna cavity and that is coupled to the positive antenna feed terminal, the transmission line being soldered to the metal sheet.

5. The electronic device of claim 2, wherein the antenna module has a fourth dielectric wall that defines a fourth edge of the antenna cavity opposite the third dielectric wall, further comprising:

grounded conductive material on the second, third, and fourth dielectric walls.

6. The electronic device of claim 5, wherein the vents have a pitch that configures the vents to be transparent to the sound waves and opaque to radio-frequency signals conveyed by the antenna.

7. The electronic device of claim 5, further comprising:

a gasket that couples the second dielectric wall to the speaker and that extends around the vents and the speaker port.

8. The electronic device of claim 7, wherein the speaker has an additional speaker port, the speaker being configured to emit the sound waves through the additional speaker port.

9. The electronic device of claim 8, wherein the antenna cavity is configured to alter an audio response of the speaker.

10. The electronic device of claim 5, further comprising:

a first conductive housing;

a display in the first conductive housing; and a second conductive housing coupled to the first conductive housing by a hinge, wherein the second conductive housing has a first conductive wall and a second conductive wall opposite the first conductive wall, the antenna module and the speaker being disposed within the second conductive housing between the first conductive wall and the second conductive wall.

11. The electronic device of claim 10, further comprising:

a first conductive gasket overlapping the antenna resonating element, wherein the first conductive gasket couples the conductive material on the fourth dielectric wall to the first conductive wall of the second conductive housing;

a second conductive gasket that couples the conductive material on the fourth dielectric wall to the first conductive wall of the second conductive housing; and a third conductive gasket that couples the conductive material on the third dielectric wall to the second conductive wall of the second conductive housing.

12. The electronic device of claim 2, wherein the third dielectric wall is ultrasonically welded to the first dielectric wall.

13. The electronic device of claim 1, further comprising:

a dielectric support structure mounted to the first dielectric wall within the antenna cavity, wherein the antenna resonating element has a first arm formed from a first conductive trace patterned onto the first dielectric wall, the antenna resonating element has a second arm formed from a second conductive trace disposed on the dielectric support structure, and the positive antenna feed terminal is coupled to the second trace disposed on the dielectric support structure.

14. An electronic device comprising:
an antenna module;
a cavity enclosed within the antenna module, wherein the antenna module has a dielectric wall that defines an edge of the cavity; and
an antenna resonating element disposed within the cavity, wherein the antenna resonating element has a return path on the dielectric wall, first and second arms extending from opposing sides of the return path, and a positive antenna feed terminal coupled to the second arm, the first arm being disposed on the dielectric wall, and the second arm and the positive antenna feed terminal being displaced farther within the cavity than the first arm in a direction normal to the dielectric wall.

15. The electronic device of claim 14, wherein the first arm is configured to radiate in a first frequency band and the second arm is configured to radiate in a second frequency band higher than the first frequency band, the electronic device further comprising:
a dielectric support structure on the dielectric wall, the second arm of the antenna resonating element and the positive antenna feed terminal being disposed on the dielectric support structure.

16. The electronic device of claim 14, further comprising:
conductive traces on the antenna module that form a radio-frequency cavity for the antenna resonating element.

17. The electronic device of claim 16, further comprising:
a speaker having a speaker port and being configured to emit sound; and
vents in the antenna module and the conductive traces that are aligned with the speaker port, the vents being configured to convey a portion of sound emitted by the speaker into and out of the cavity.

18. The electronic device of claim 17, further comprising:
a first conductive housing;
a display in the first conductive housing; and
a second conductive housing coupled to the first conductive housing by a hinge, wherein the second conductive housing has a first conductive wall and a second conductive wall opposite the first conductive wall, the antenna module and the speaker are disposed within the second conductive housing between the first conductive wall and the second conductive wall, and the conductive traces are electrically coupled to the first conductive wall and the second conductive wall.

19. An electronic device comprising:
a housing having an upper housing portion that contains a display and having a lower housing portion, wherein the lower housing portion has opposing first and second conductive walls;
a hinge that couples the upper housing portion to the lower housing portion, wherein the upper housing portion is rotatable with respect to the lower housing portion and is separated from the lower housing portion by a slot;
an antenna module disposed in the lower housing portion between the first and second conductive walls, a cavity being enclosed within the antenna module;
an antenna resonating element disposed within the cavity of the antenna module and configured to convey radio-frequency signals through the slot, wherein the antenna has a first arm configured to radiate in a first frequency band and a second arm configured to radiate in a second frequency band higher than the first frequency band, the second arm being disposed farther into the cavity than the first arm;
a speaker disposed in the lower housing portion between the first and second conductive walls, wherein the speaker has a speaker port facing the cavity and a first set of openings in the first conductive wall and is configured to emit sound waves through the speaker port and the first set of openings; and
an acoustic port structure on the antenna module and aligned with the speaker port, wherein the acoustic port structure is configured to convey a portion of the sound waves into and out of the cavity through a second set of openings in a wall of the cavity.

20. The electronic device of claim 19, wherein the speaker port and the second set of openings are sealed together.

* * * * *